US007946774B2

(12) United States Patent
Matias (10) Patent No.: US 7,946,774 B2
(45) Date of Patent: May 24, 2011

(54) FOLDING KEYBOARD WITH NUMERIC KEYPAD

(75) Inventor: Edgar Matias, Toronto (CA)

(73) Assignee: The Matias Corporation, Newmarket, Ontario (CA)

( * ) Notice: Subject to any disclaimer, the term of this patent is extended or adjusted under 35 U.S.C. 154(b) by 571 days.

(21) Appl. No.: 12/028,942

(22) Filed: Feb. 11, 2008

(65) Prior Publication Data

US 2008/0253822 A1 Oct. 16, 2008

Related U.S. Application Data

(60) Provisional application No. 60/912,024, filed on Apr. 16, 2007.

(51) Int. Cl.
*B41J 5/00* (2006.01)
*G06F 3/023* (2006.01)

(52) U.S. Cl. .................................. 400/472; 345/168

(58) Field of Classification Search ............ 400/472, 400/486; 345/168
See application file for complete search history.

(56) References Cited

U.S. PATENT DOCUMENTS

| | | | |
|---|---|---|---|
| 3,940,758 A | 2/1976 | Margolin | |
| 4,044,980 A * | 8/1977 | Cummins | 248/456 |
| 5,410,333 A * | 4/1995 | Conway | 345/169 |
| 5,457,453 A | 10/1995 | Chiu et al. | |
| 5,519,569 A | 5/1996 | Sellers | |
| 5,574,481 A | 11/1996 | Lee | |
| 5,653,543 A * | 8/1997 | Abe | 400/489 |
| 5,687,058 A | 11/1997 | Roylance | |
| 5,703,578 A | 12/1997 | Allison | |
| 5,712,760 A * | 1/1998 | Coulon et al. | 361/679.15 |
| 5,933,320 A | 8/1999 | Malhi | |
| 5,943,041 A | 8/1999 | Allison et al. | |
| 5,982,612 A | 11/1999 | Roylance | |
| 5,995,025 A | 11/1999 | Sternglass et al. | |
| D420,655 S | 2/2000 | Louis et al. | |
| 6,168,331 B1 | 1/2001 | Vann | |
| 6,174,097 B1 | 1/2001 | Daniel | |
| D457,525 S | 5/2002 | Olodort et al. | |
| 6,547,463 B1 * | 4/2003 | Loo | 400/472 |

(Continued)

FOREIGN PATENT DOCUMENTS

DE 4335035 C1 12/1994

(Continued)

OTHER PUBLICATIONS

UK Combined Search and Examination Report of Jul. 21, 2008, UK Intellectual Property Office.

*Primary Examiner* — Daniel J Colilla
*Assistant Examiner* — David Banh
(74) *Attorney, Agent, or Firm* — Perry + Currier Inc.

(57) ABSTRACT

A folding keyboard is set forth with a numeric keypad, and one fold line located between the edge of a standard continuous space bar and the edge of the numeric keypad. Preferably, the keyboard further includes left and right top cases, supporting inexpensive rubber dome switches, left and right bottom cases, membrane sheets with circuit traces connecting keyboard electronics to contact points under each key, two hinge screws or rivets (or the like) that hold the left and right sides of the keyboard together at the hinges, and a locking mechanism to keep the case closed when folded shut.

14 Claims, 14 Drawing Sheets

U.S. PATENT DOCUMENTS

| | | |
|---|---|---|
| 6,575,647 B1 | 6/2003 | Daniel |
| 6,585,440 B2 * | 7/2003 | Lin ............................. 400/681 |
| 6,594,142 B2 | 7/2003 | Katz |
| 6,679,639 B2 | 1/2004 | Katz |
| 6,698,957 B2 * | 3/2004 | Huang ......................... 400/472 |
| 6,734,809 B1 * | 5/2004 | Olodort et al. ................. 341/22 |
| 6,773,179 B2 * | 8/2004 | Huang et al. ................. 400/472 |
| 6,793,421 B1 * | 9/2004 | Baldwin et al. ............. 400/488 |
| 6,798,649 B1 | 9/2004 | Olodort et al. |
| 6,803,904 B2 | 10/2004 | Furuki et al. |
| 6,839,002 B2 | 1/2005 | Olodort et al. |
| 6,877,919 B2 | 4/2005 | Sitalasai et al. |
| 6,894,626 B2 | 5/2005 | Olodort et al. |
| 6,920,039 B2 | 7/2005 | Mochizuki et al. |
| 6,972,699 B2 | 12/2005 | Olodort et al. |
| 7,031,143 B2 * | 4/2006 | Madsen et al. ............. 361/679.2 |
| 7,125,180 B2 * | 10/2006 | Hsu ........................... 400/489 |
| 2002/0001498 A1 * | 1/2002 | Li et al. ...................... 400/472 |
| 2002/0066651 A1 * | 6/2002 | Furuki et al. ................. 200/5 A |
| 2002/0101405 A1 | 8/2002 | Chang |
| 2003/0137803 A1 | 7/2003 | Loo |
| 2004/0151527 A1 | 8/2004 | Sitalasai et al. |
| 2004/0169642 A1 * | 9/2004 | Olodort et al. ................ 345/168 |
| 2005/0002158 A1 * | 1/2005 | Olodort et al. ................ 361/683 |
| 2005/0017953 A1 * | 1/2005 | Pekka ........................ 345/169 |
| 2005/0231933 A1 * | 10/2005 | Chuang ........................ 362/23 |
| 2006/0038775 A1 | 2/2006 | Agata et al. |
| 2006/0071820 A1 * | 4/2006 | Wang et al. .................. 341/22 |
| 2006/0099023 A1 * | 5/2006 | Katz et al. ................... 400/472 |
| 2006/0192689 A1 * | 8/2006 | Wang et al. .................. 341/22 |
| 2007/0008291 A1 * | 1/2007 | Liu ............................ 345/168 |
| 2008/0212307 A1 * | 9/2008 | Chan et al. ..................... 362/85 |
| 2010/0141588 A1 * | 6/2010 | Kimura et al. ................ 345/169 |

FOREIGN PATENT DOCUMENTS

| | | | |
|---|---|---|---|
| JP | 2003271289 A | * | 9/2003 |
| WO | 9406073 A1 | | 3/1994 |

\* cited by examiner

FOLDING KEYBOARD WITH NUMERIC KEYPAD

FIELD

The present invention relates generally to computer keyboards and, more particularly, to a computer keyboard that neatly folds together for storage or travel.

BACKGROUND

Folding computer keyboards are known in the art. Generally, such prior art folding keyboards fall into two categories: keyboards that fold in half along a line that divides the spacebar, and keyboards that are folded into three or more sections.

The following patents set forth folding keyboards in the first aforesaid category: U.S. Pat. Nos. 6,174,097; 6,575,647; U.S. Pat. D457,525, U.S. Pat. D420,655; U.S. Pat Nos. 6,877,919; 6,972,699; 6,894,626; 6,839,002; 6,803,904; 6,798,649; 6,793,421; 6,698,957; 6,734,809; 6,594,142; 6,679,639; 6,920,039; 6,547,463; 6,585,440; 5,982,612; 5,943,041; 5,703,578; 5,653,543; 5,574,481; 5,457,453; 5,712,760 and 5,933,320.

Most competent typists type by touch. Touch typing is typing using the sense of touch rather than sight to find the keys. Touch typing usually involves placement of the typist's eight fingers in a horizontal row along the middle of the keyboard (the home row) within reach of the other keys. Most computer keyboards have a raised dot or bar on either the F/J keys or the D/K keys (or the keys in the same position, for non-QWERTY keyboards) so that touch-typists can feel them when their fingertips are over the correct home row.

In order for a folding keyboard to 'feel' like a standard keyboard to a touch typist, certain properties are generally desirable. One of these properties is a continuous, unbroken space bar that runs from the C key to the M key (on a US keyboard). This also means that the spacebar needs to be five standard key widths wide, or wider. The foregoing prior art suffers from the disadvantage that the space bar is broken.

The second category of patents referred to above, maintains an unbroken spacebar by splitting the keyboard into three or more sections, and then folding the sections together (or stacking them). Although this second category of keyboards provides a better 'feel' to the keyboard, the resulting design may include multiple complicated hinge mechanisms, as well as a thicker and/or longer package when the keyboarded is folded.

The following patents set forth folding keyboards in the second aforesaid category of prior art: U.S. Pat. Nos. 3,940,758; 5,519,569; 5,687,058 and 5,995,025.

SUMMARY

According to an aspect of an embodiment, a folding keyboard is provided having a standard continuous spacebar, the keyboard including a first keyboard portion and a second keyboard portion, the keyboard portions coupled at a fold line, the fold line located between the standard continuous space bar and an edge of the keyboard.

DETAILED DESCRIPTION OF THE PREFERRED EMBODIMENTS

An exemplary embodiment of the invention is set forth below. However, a person of skill in the art will appreciate that other embodiments and variations may be possible.

Figure 1:
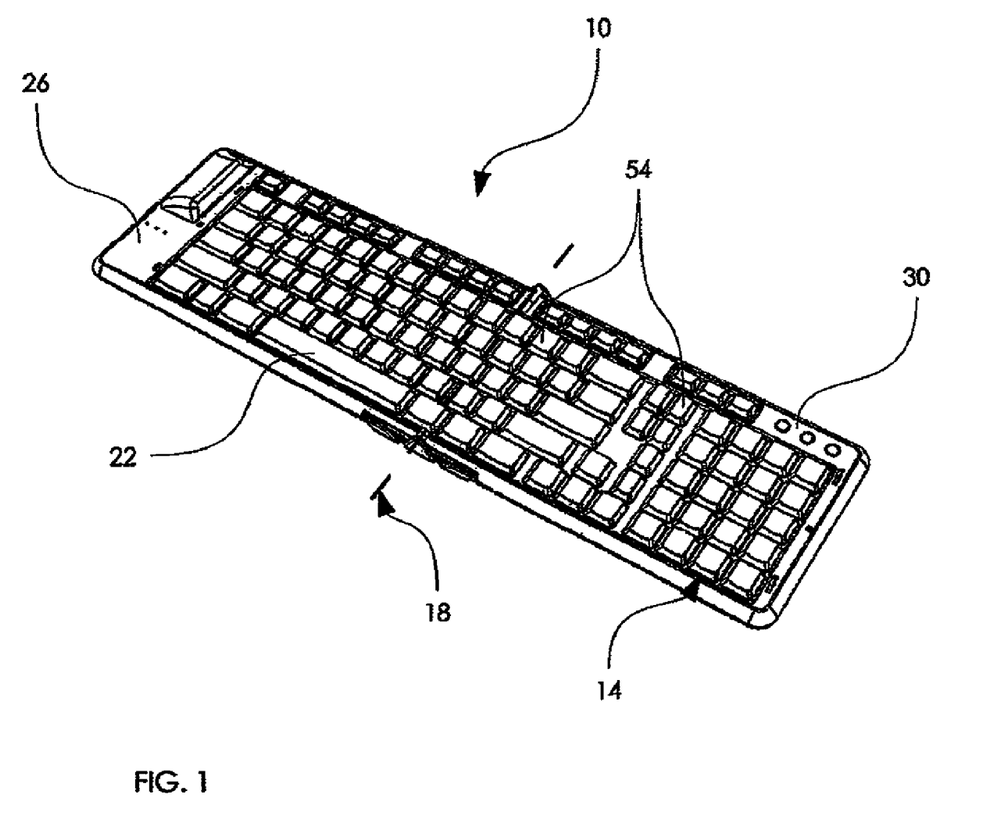
FIG. 1 depicts a keyboard open and ready for use, according to a non-limiting embodiment.

Referring now to FIG. 1, a folding keyboard 10 is provided with a numeric keypad 14. Keyboard 10 may fold at a fold line 18, which may be located between the edge of a standard continuous space bar 22 and the edge of numeric keypad 14. It will be appreciated that fold line 18 may alternatively be located between the edge of space bar 22 and an edge of keyboard 10, and that numeric keypad 14 may be replaced with other selections of keys or surfaces, or may be omitted.

Figure 2A:
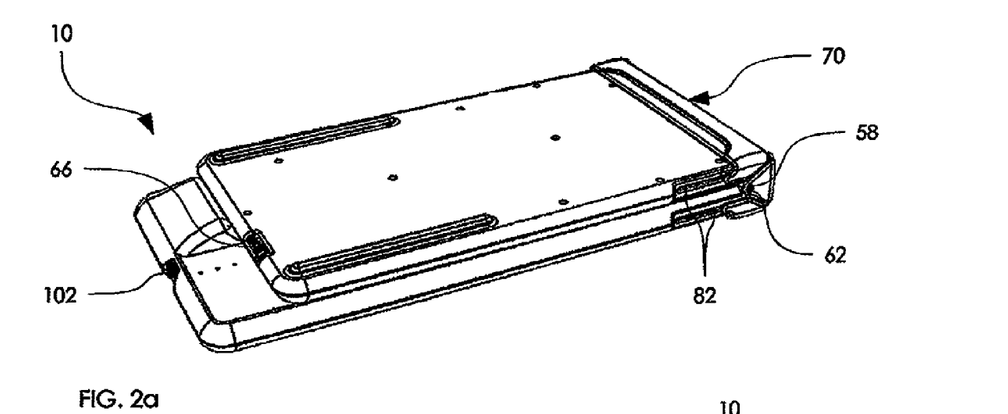
FIGS. 2a-2c depict perspective, side and top views of the keyboard of FIG. 1 in a folded position, according to a non-limiting embodiment.
Figure 2B:
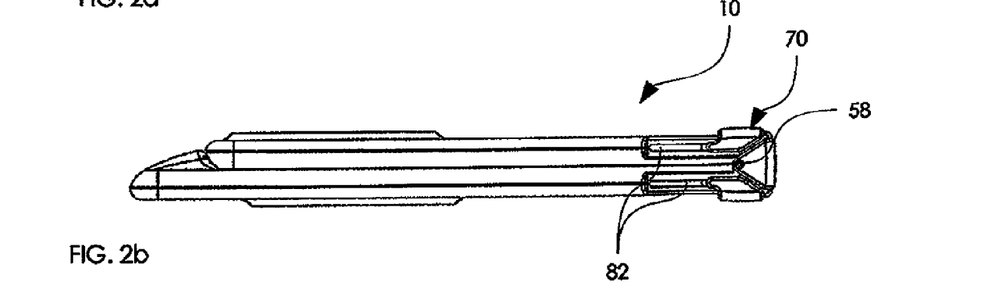
Figure 2C:
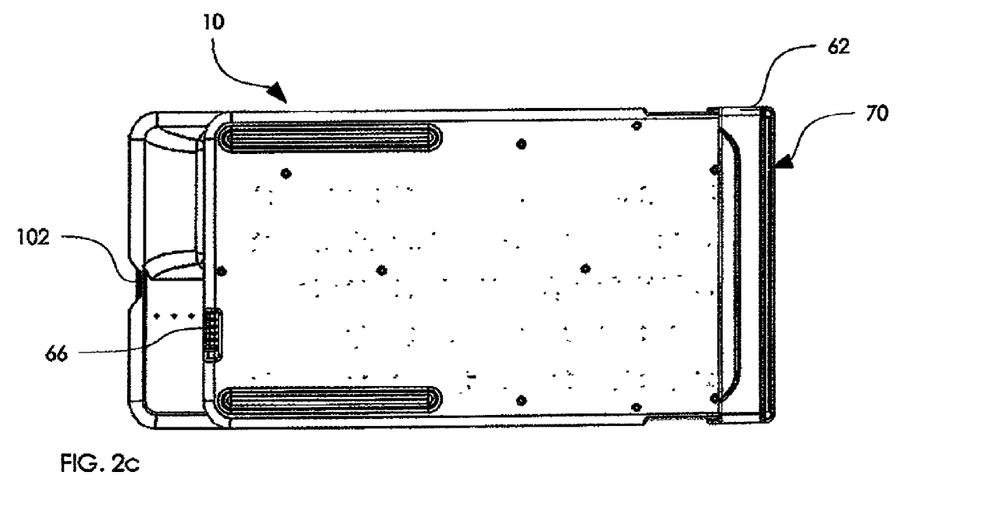
Figure 3A:
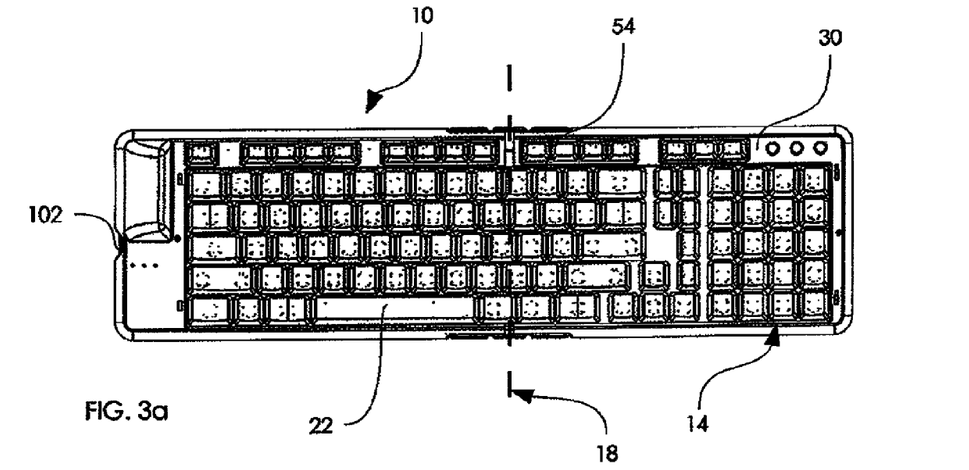
FIGS. 3a-3c depict top, side and bottom views of the keyboard of FIG. 1 open, according to a non-limiting embodiment.
Figure 3B:
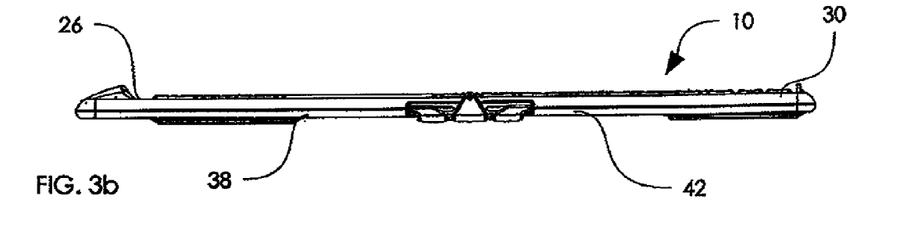
Figure 3C:
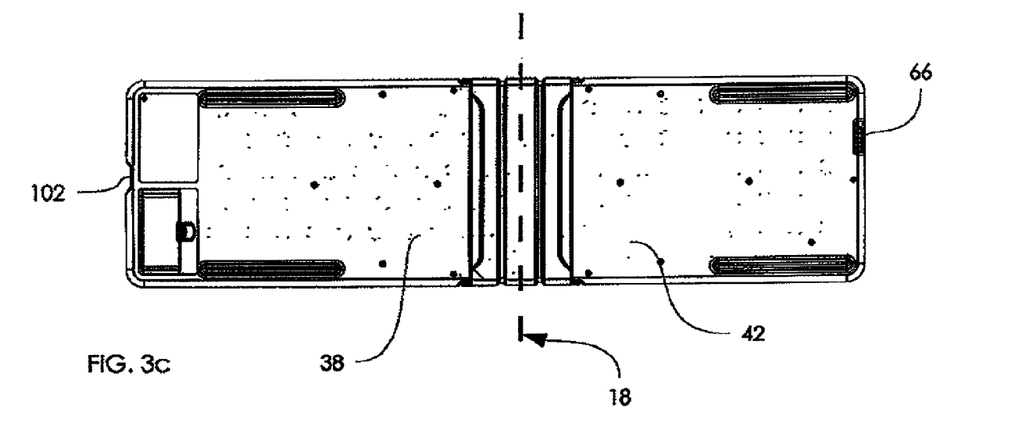
Figure 4:
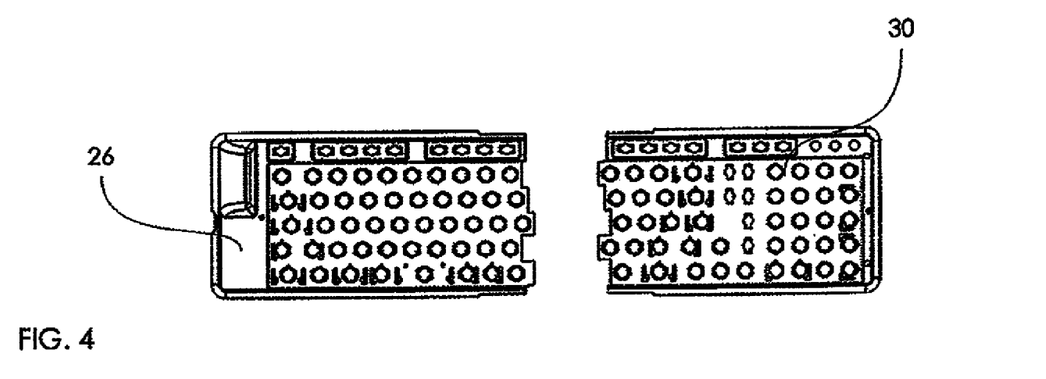
FIG. 4 depicts a top view of left and right top cases of the keyboard of FIG. 1, according to a non-limiting embodiment.
Figure 5:
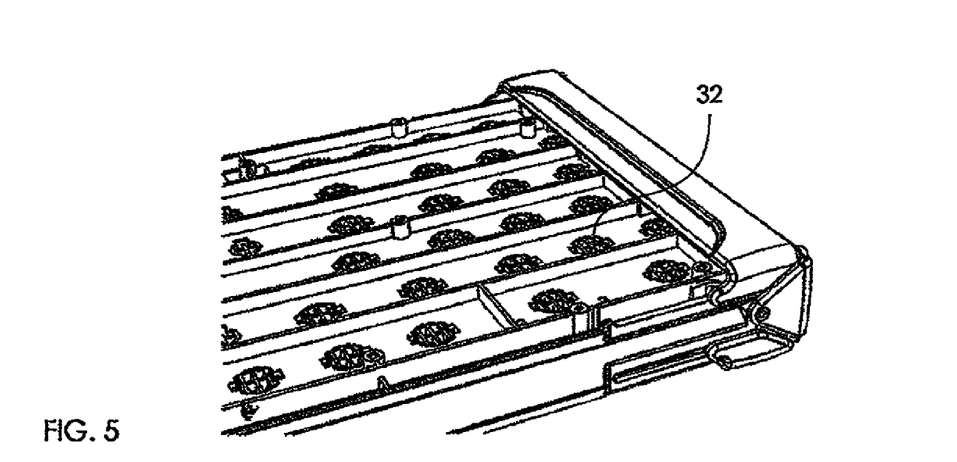
FIG. 5 depicts a perspective view of a portion of the keyboard of FIG. 1 in a folded position with a bottom case removed, showing internal support structures for rubber dome switches, according to a non-limiting embodiment.
Figure 8:
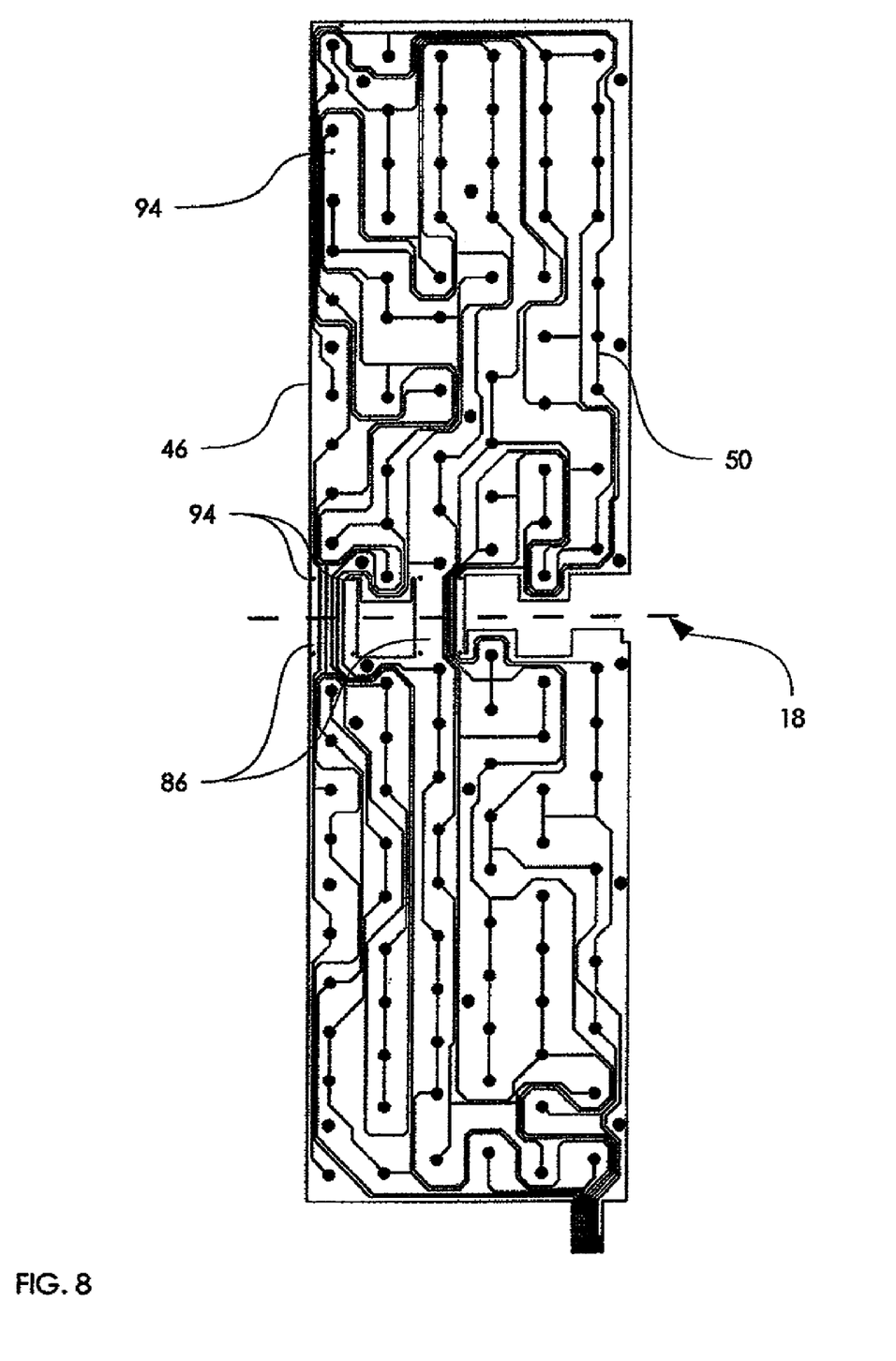
FIG. 8 depicts one layer of a membrane circuit sheet of the keyboard of FIG. 1, according to a non-limiting embodiment.

Keyboard 10 may include a left top case 26 and a right top case 30, as depicted in FIGS. 1 and 4. Top cases 26 and 30 may include a plurality of support structures 32, depicted in FIG. 5, for supporting inexpensive rubber dome switches (not shown). Keyboard 10 may also include a left bottom case 38 and a right bottom case 42, as depicted in FIGS. 3b and 3c. Bottom cases 38 and 42 may be coupled to top cases 26 and 30 by attachment mechanisms such as screws, rivets, adhesive or the like. Keyboard 10 may further include at least one membrane sheet 46 with circuit traces 50, as depicted in FIG. 8. Membrane sheet 46 may be housed in between top cases 26 and 30 and bottom cases 38 and 42, and circuit traces 50 may connect keyboard electronics to contact points under each of a plurality of keys 54. A pair of hinge attachments 58, such as screws, rivets or the like, couple the left and right sides of keyboard 10 at a hinge 62 located at fold line 18. A locking mechanism 66, depicted in FIGS. 2a and 2c, keeps keyboard 10 closed when folded shut.

Figure 13:
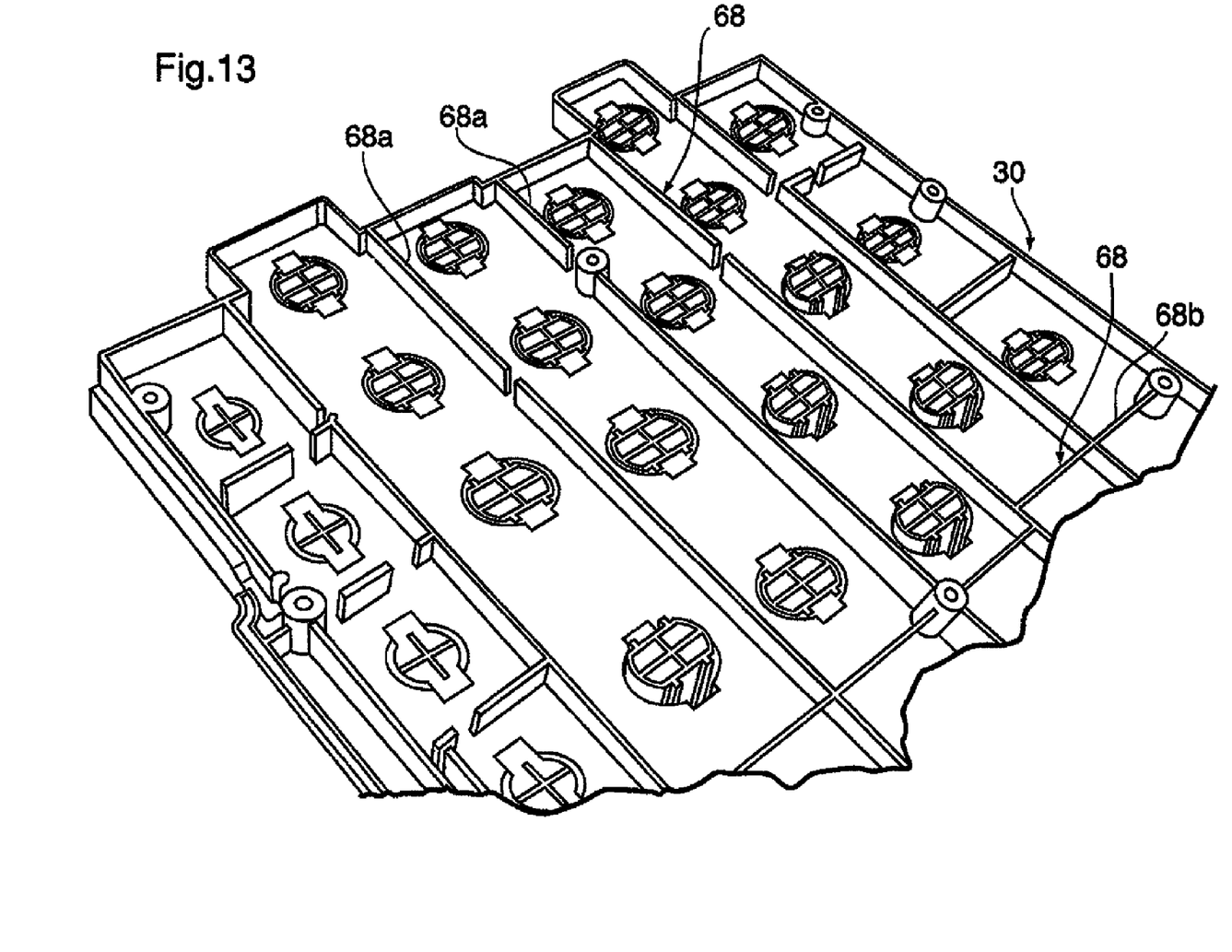
FIG. 13 depicts a bottom perspective view of the right top case of FIG. 4, according to a non-limiting embodiment.

Top case 30, as depicted in FIG. 13, may include a plurality of reinforcing ribs 68. It will be understood that any combination of top or bottom cases 26, 30, 38 and 42 may include ribs 68. Ribs 68 may be disposed on the inner side of top case 30. Ribs 68 extend substantially perpendicularly from the inner surface of top case 30, and may include a first set of ribs 68a and a second set of ribs 68b which are substantially perpendicular to ribs 68a.

Figure 14:
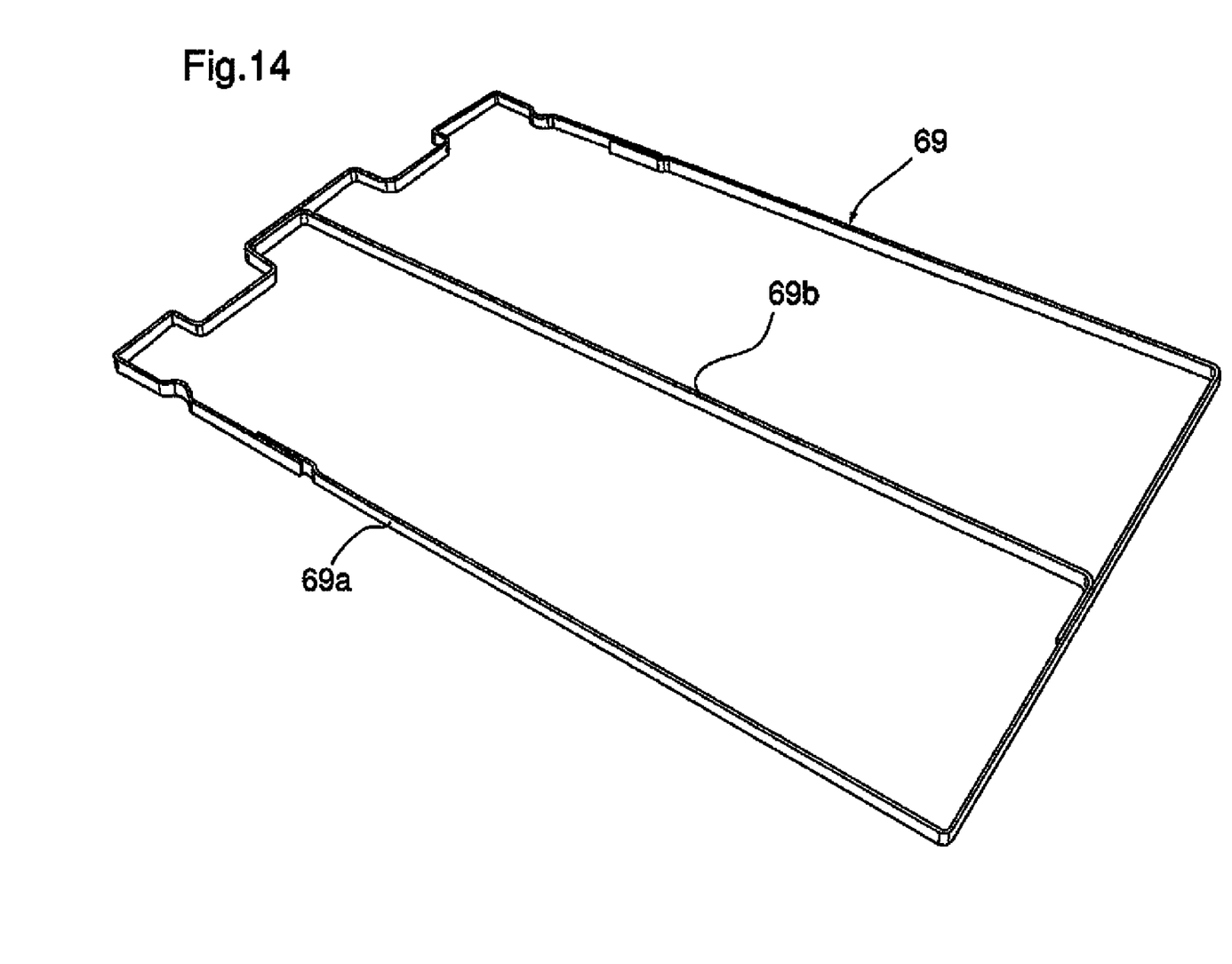
FIG. 14 depicts perspective view of a frame for use with the right top case of FIG. 13, according to a non-limiting embodiment.
Figure 15:
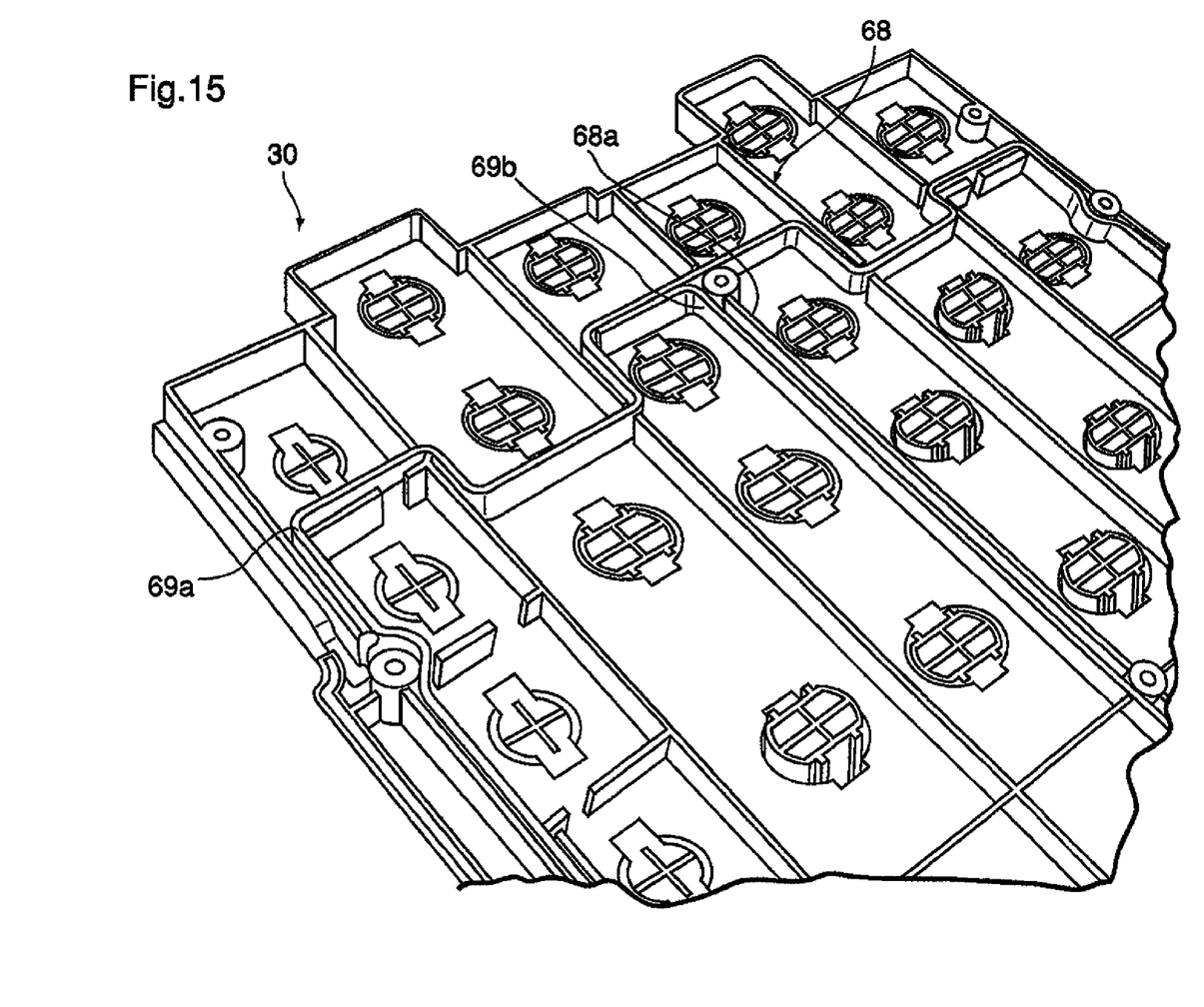
FIG. 15 depicts a perspective view of a portion of the right top case of FIG. 13 and a portion of the frame of FIG. 14, according to a non-limiting embodiment.

Referring now to FIGS. 14 and 15, additional rigidity may be provided by a frame 69. Frame 69 may include a peripheral portion 69a which corresponds in shape substantially to the outline of top case 30. Frame 69 may also include a central portion 69b which is configured to lie adjacent to a rib 68 of top case 30, as depicted in FIG. 15. Frame 69 is preferably made of a lightweight, rigid material such as steel, aluminum and the like.

Figure 6A:
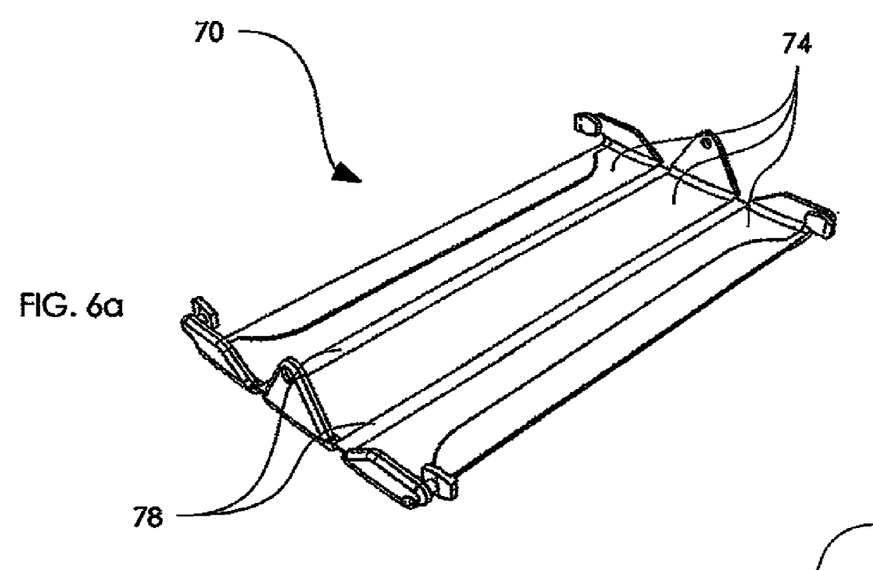
FIGS. 6a-6b depict perspective views of a hinge cover, in open and folded positions, respectively, of the keyboard of FIG. 1, according to a non-limiting embodiment.
Figure 6B:
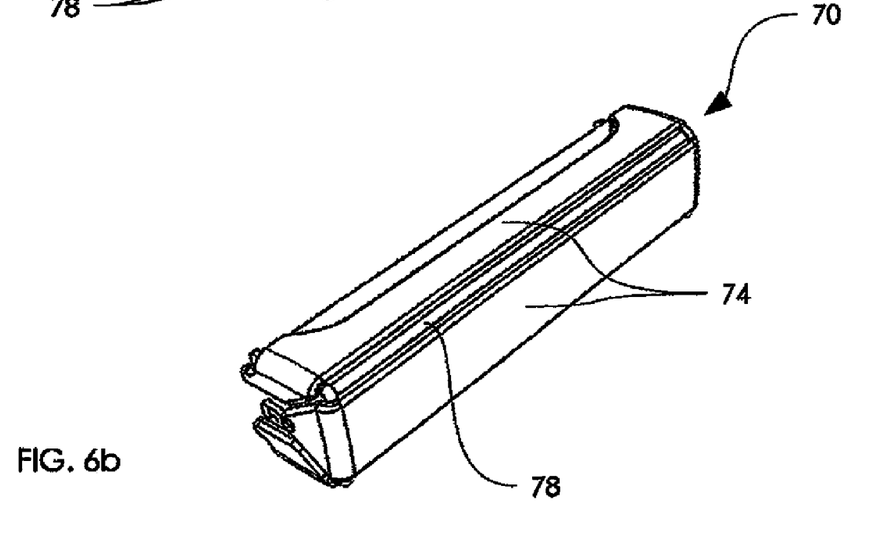
Figure 7A:
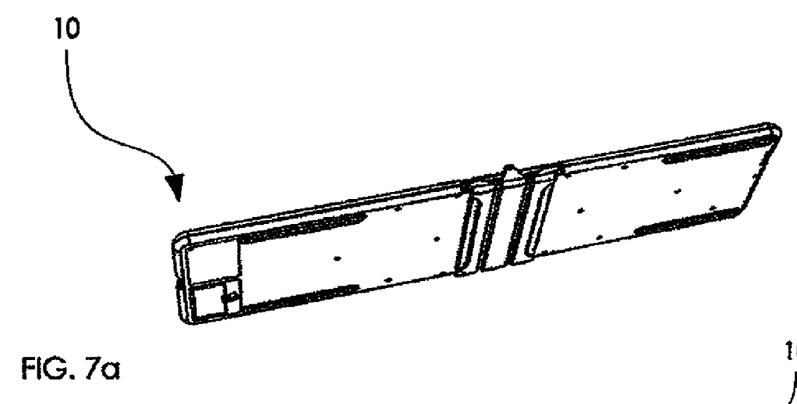
FIG. 7a depicts a perspective bottom view of the keyboard of FIG. 1 in the open position.
Figure 7B:
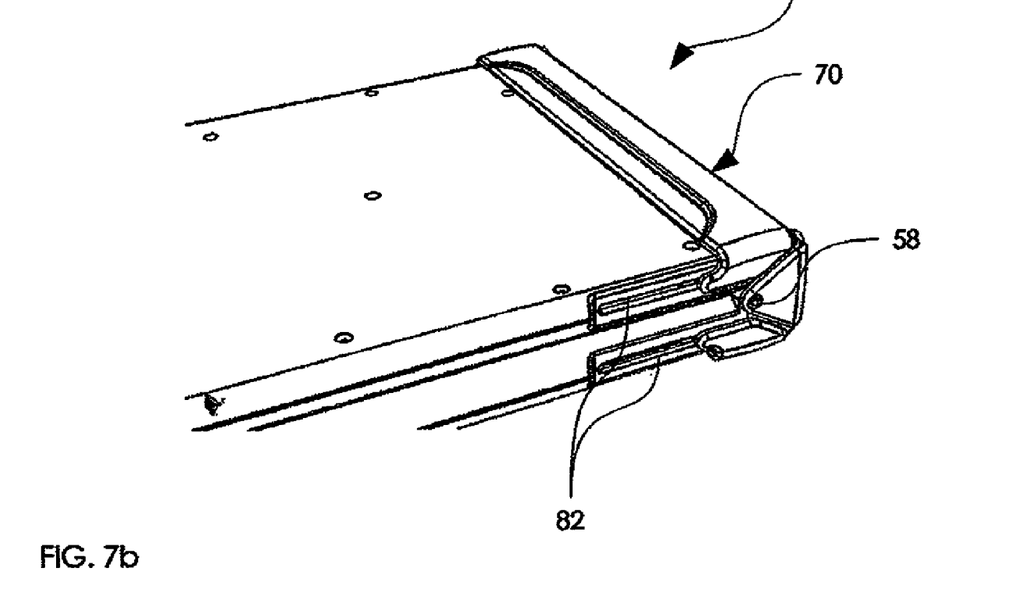
FIG. 7b depicts a perspective view of a portion of the keyboard showing details of the hinge cover of FIGS. 6a-6b, in the folded position, according to a non-limiting embodiment.

Keyboard 10 may also include a hinge cover 70, depicted in FIGS. 6a and 6b. Hinge cover 70 may be made of a single piece of nylon, polypropylene, or other material of similar flexibility and rigidity, with three panels 74 connected by two living hinges 78 also known as "flexure bearings", thus allowing hinge cover 70 to fold in two places or lie flat.

Hinge cover 70 may be connected to keyboard 10 by hinge screws 58, and also along four tracks 82, depicted in FIGS. 2a-2c and 7, built into the left and right sides of keyboard 10. Each track 82 may have an indentation at the end of track 82 to allow keyboard 10 to lock in an open position.

Referring now to FIG. 8, circuit traces 50 of membrane sheet 46 may pass between the left and right sides of the keyboard at one or two membrane folding points which lie substantially along fold line 18, and at which membrane sheet 46 folds when keyboard 10 is closed. At these points, membrane sheet 46 may narrow to form at least one bridge 86.

Figure 9A:
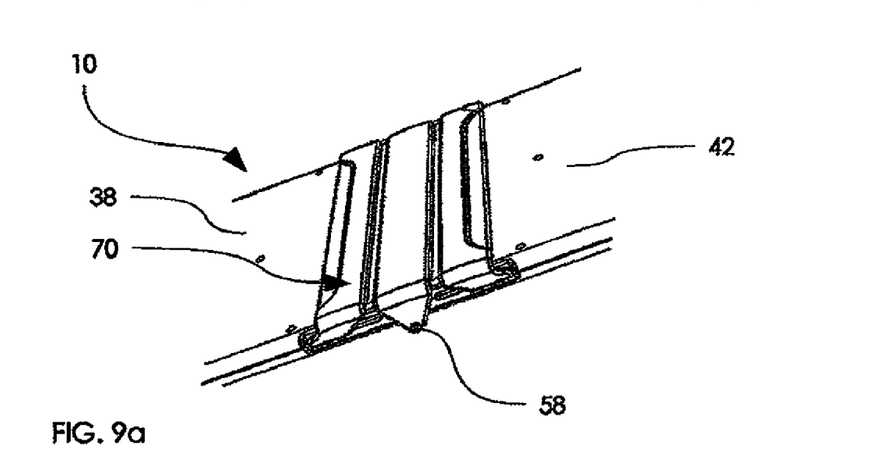
FIG. 9a depicts a perspective view of a portion of the bottom of the keyboard of FIG. 1 in the open position.
Figure 9B:
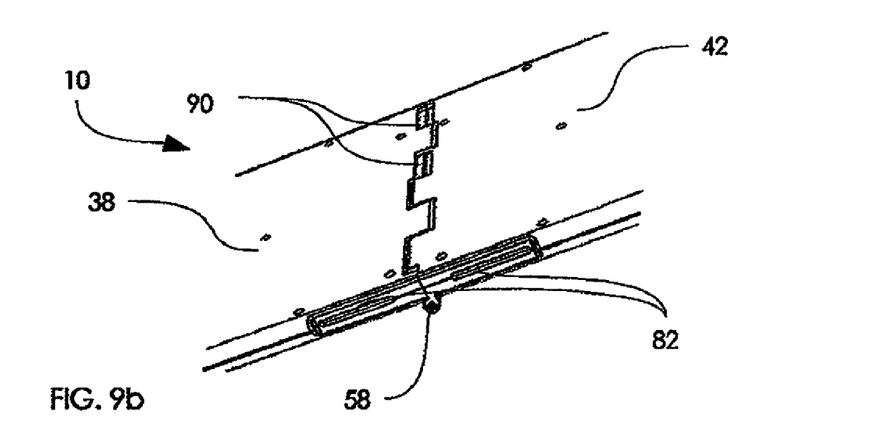
FIG. 9b is a similar view as FIG. 9a but with the hinge cover removed to reveal a cavity for a membrane bridge of the keyboard of FIG. 1.
Figure 9C:
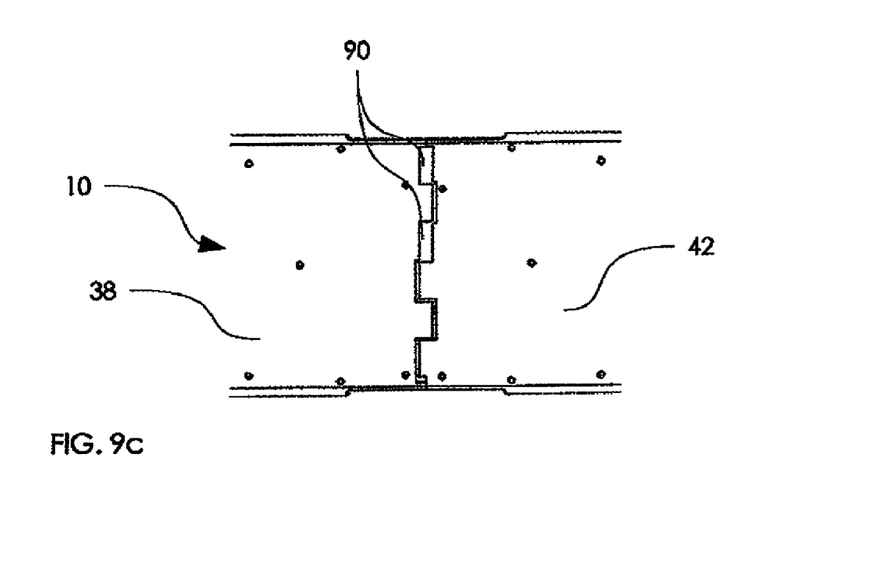
FIG. 9c depicts a bottom view similar to FIG. 9b, according to a non-limiting embodiment.
Figure 10:
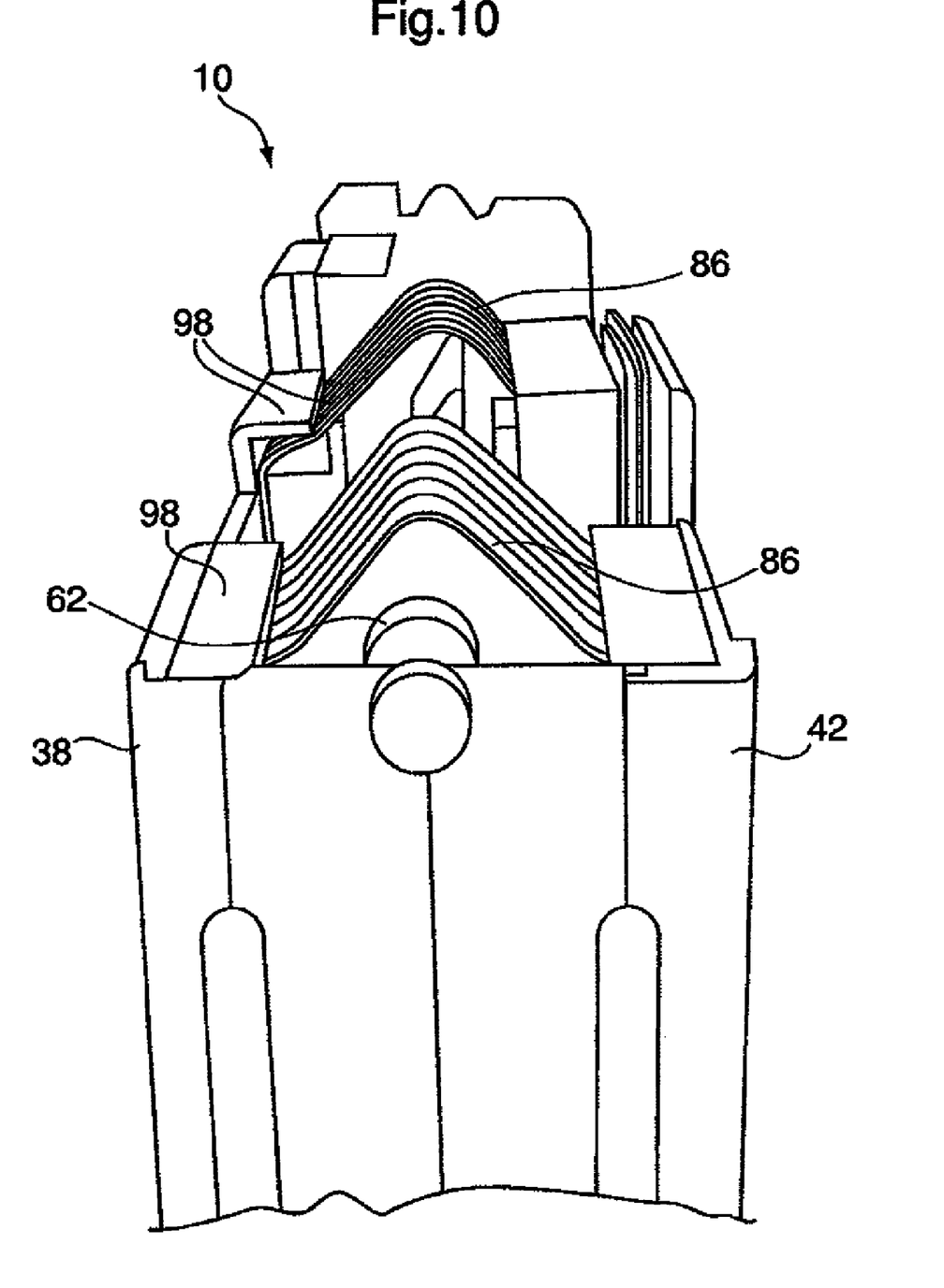
FIG. 10 depicts a perspective view of an end portion of the keyboard of FIG. 1 in a folded position, showing details of the hinge, a portion of the membrane and surrounding structures according to a non-limiting embodiment.
Figure 11:
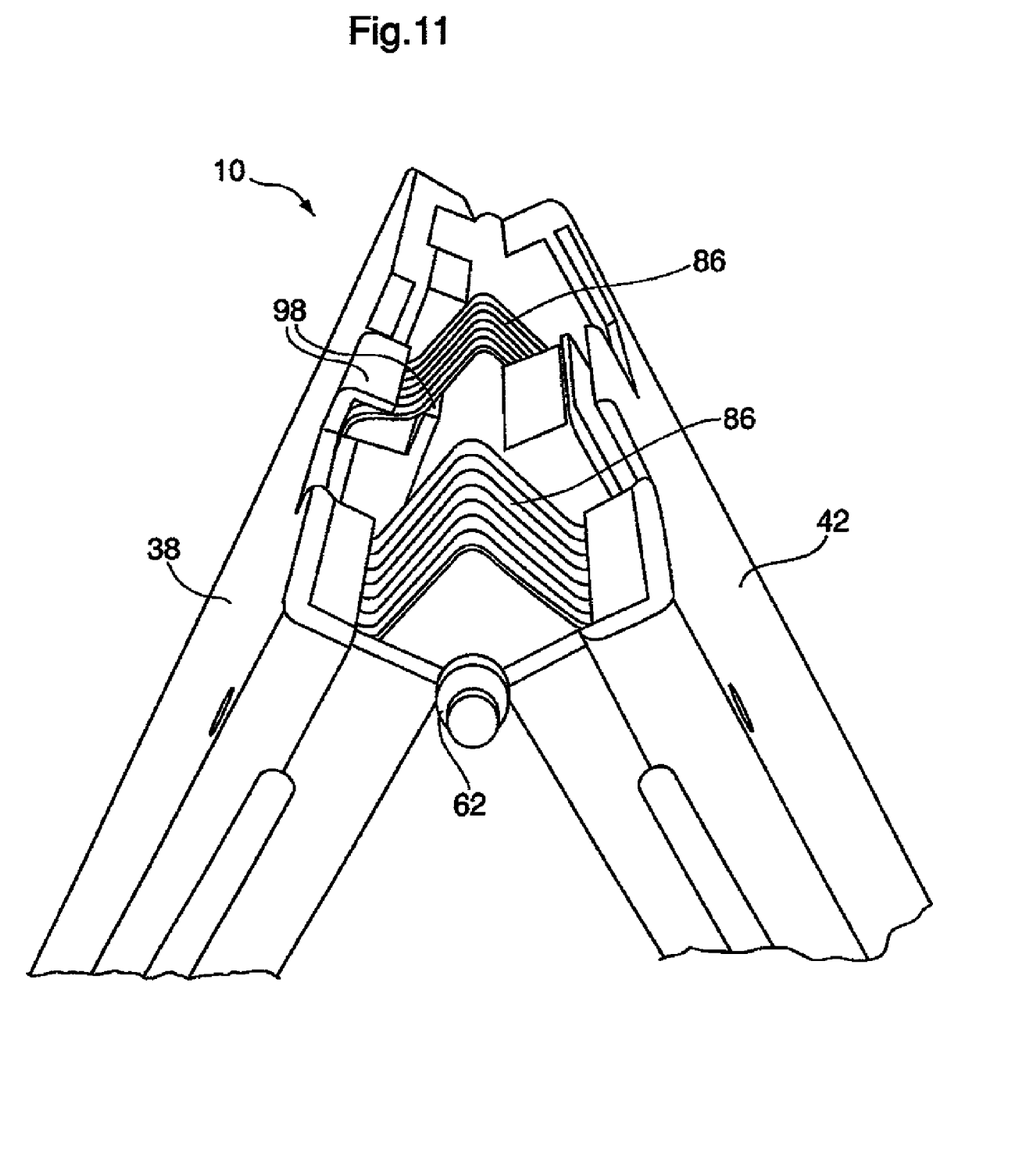
FIG. 11 is similar to FIG. 10, but with the keyboard of FIG. 1 in a partially open position, according to a non-limiting embodiment.
Figure 12:
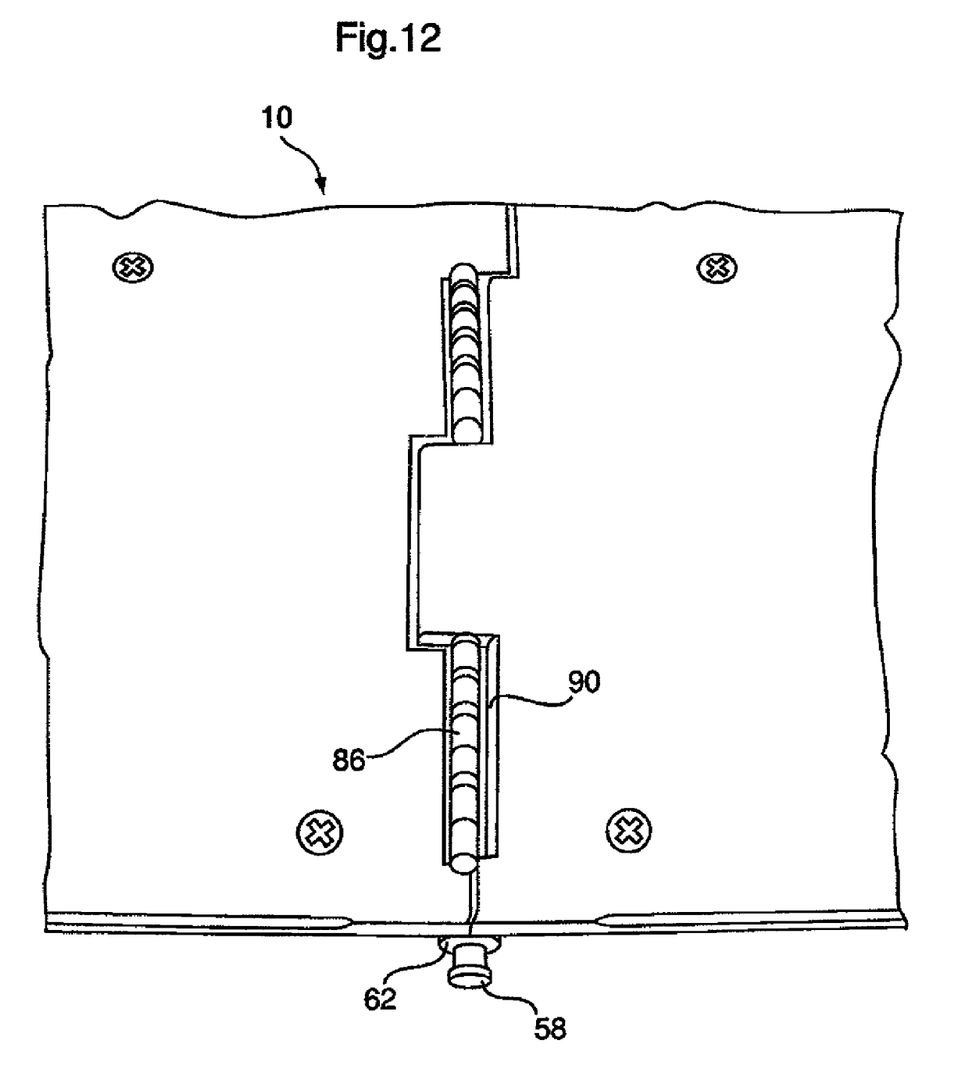
FIG. 12 depicts a bottom view of the hinge, a portion of the membrane and surrounding structures of the keyboard of FIG. 1 in an open position, according to a non-limiting embodiment.

Referring now to FIGS. 9b and 9c, bottom cases 38 and 42 may be shorter than top cases 26 and 30 near bridges 86, thus creating cavities 90 along fold line 18 on the underside of keyboard 10. As depicted in FIGS. 10-12, bridges 86 of membrane sheet 46 fold progressively into cavities 90 as keyboard 10 opens, and the required length of bridges 86 may be reduced by cavities 90. In the absence of cavities 90, bridges 86 would be required to travel further within each side of keyboard 10 before exiting one side of keyboard 10 and traveling over hinge 62 to enter the other side of keyboard 10. Cavities 90 allow bridges 86 to exit each side of keyboard 10 earlier and immediately angle towards hinge 62.

Referring back to FIG. 8, a plurality of alignment posts (not shown) may extend inside keyboard 10 from top cases 26 and 30 or bottom cases 38 and 42. The alignment posts may be located near bridges 86, and a plurality of corresponding alignment holes 94 in membrane sheet 46 ensure that membrane sheet 46 does not slip out of position within keyboard 10 when keyboard 10 is folded or unfolded. Additionally, keyboard 10 may include a plurality of internal protrusions 98 as depicted in FIGS. 10 and 11. Protrusions 98 guide bridges 86, ensuring that bridges 86 exit one side of keyboard 10 and enter the other side of keyboard 10 at constant orientations. This guidance facilitates the folding of bridges 86 by ensuring that bridges 86 remain curved at all times, avoiding undesirable shifting or kinks, as evidenced by the progressive opening of keyboard 10 depicted in FIGS. 10-12.

Preferably, one membrane fold point is located between the I and O keys according to the layout of a standard US keyboard (or the corresponding position on a non-US keyboard) and another membrane fold point may be on the function key row.

Alternatively, the one membrane fold point may be located between the O and P keys according to the layout of a standard US keyboard (or the corresponding position on a non-US keyboard) and another membrane fold point may be on the function key row.

Alternatively, the one membrane fold point may be located between the P and [ keys according to the layout of a standard US keyboard (or the corresponding position on a non-US keyboard) and another membrane fold point may be on the function key row.

Alternatively, the one membrane fold point may be located between the [ and ] keys according to the layout of a standard US keyboard (or the corresponding position on a non-US keyboard) and another membrane fold point may be on the function key row.

Preferably, necessary electronics are provided in the keyboard to support a standard USB or PS/2 or other wired interface, for use with a laptop or desktop computer, or other device supporting said interface.

Preferably, necessary electronics are also provided in the keyboard to support a wired or wireless interface, for use with a laptop or desktop computer, or other device supporting said interface. Connector 102, depicted in FIG. 2a, may be a standard PS/2 connector, or a mini USB connector in a wired embodiment of keyboard 10, or a connection button in a wireless embodiment of keyboard 10.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A folding keyboard having a standard continuous spacebar, the keyboard comprising:
   a first keyboard portion and a second keyboard portion, the keyboard portions coupled at a fold line, the fold line located between the standard continuous space bar and an edge of the keyboard;
   a top case and a bottom case for each said keyboard portion;
   at least one membrane sheet having circuit traces connecting a plurality of contact points located adjacent to a plurality of keys;
   a plurality of attachments mechanisms for coupling the first and second keyboard portions at a hinge located at the fold line;
   a locking mechanism for releasably keeping the keyboard in a folded position; wherein
   the at least one membrane sheet includes at least one bridge portion defining at least one membrane fold point crossing the fold line;

the bottom cases of the first and second keyboard portions define at least one cavity adjacent to the at least one narrowed bridge portion; and the circuit traces of the at least one membrane sheet cross between the first and second keyboard portions along the at least one narrowed bridge portion; and the at least one narrowed bridge portion extends through, said at least one cavity when said keyboard is in an unfolded position and a plurality of protrusions extending from at least one of the top and bottom cases of the first and second keyboard portions, the protrusions extending adjacent to the at least one narrowed bridge portion and contacting the at least one narrowed bridge portion so as to restrict the movement of the at least one narrowed bridge portion such that the at least one narrowed bridge portion remains curved substantially at all times.

2. The folding keyboard of claim 1 further comprising a hinge cover coupled to the keyboard by said attachment mechanisms, said hinge cover having a plurality of panels for substantially covering the hinge, said panels being connected by at least one living hinge.

3. The folding keyboard of claim 2, wherein the hinge cover is made of a single piece of nylon.

4. The folding keyboard of claim 2, wherein the hinge cover is made of a single piece of polypropylene.

5. The folding keyboard of claim 2, wherein each keyboard portion includes a plurality of tracks, each track receiving a portion of the hinge cover.

6. The folding keyboard of claim 5, wherein each track includes an indentation at one end for releasably locking the keyboard in an unfolded position.

7. The folding keyboard of claim 1, further comprising:

a plurality of alignment posts extending within the keyboard from one of the first and second keyboard portions towards the other of the first and second keyboard portions;

wherein the at least one membrane sheet defines a plurality of alignment holes corresponding to the alignment posts; and wherein the alignment posts extend through the alignment holes and substantially prevent undesirable motion of the at least one membrane sheet in relation to the keyboard.

8. The keyboard of claim 1, wherein a first said at least one membrane fold point is located between I and O keys of said keyboard and a second said at least one membrane fold point is located on a function key row of said keyboard.

9. The keyboard of claim 1, wherein a first said at least one membrane fold point is located between O and P keys of said keyboard and a second said at least one membrane fold point is located on a function key row of said keyboard.

10. The keyboard of claim 1, wherein a first said at least one membrane fold point is located between P and [ keys of said keyboard and a second said at least one membrane fold point is located on a function key row of said keyboard.

11. The keyboard of claim 1, wherein a first said at least one membrane fold point is located between [ and ] keys of said keyboard and a second said at least one membrane fold point is located on a function key row of said keyboard.

12. The folding keyboard according to claim 1 further comprising a plurality of ribs extending from at least one of the top and bottom cases of the first and second keyboard portions; and at least one frame coupled to at least one of the top and bottom cases of the first and second keyboard portions, the frame having one or more coupled elongated bands.

13. The folding keyboard of claim 12, wherein the at least one frame is configured to correspond substantially in shape to the periphery of the at least one of the top and bottom cases of the first and second keyboard portions.

14. The folding keyboard of claim 12, wherein the at least one frame is made of a metal.

* * * * *